No. 831,815. PATENTED SEPT. 25, 1906.
P. F. WILLIAMS.
CONNECTOR FOR ELECTRICAL CONDUCTORS.
APPLICATION FILED MAY 23, 1905.

3 SHEETS—SHEET 1.

Witnesses:
M. Duplessis
J. C. Lee

Inventor.
Paul F. Williams.
by H. Miller Refield
Att.

No. 831,815. PATENTED SEPT. 25, 1906.
P. F. WILLIAMS.
CONNECTOR FOR ELECTRICAL CONDUCTORS.
APPLICATION FILED MAY 23, 1905.
3 SHEETS—SHEET 2.
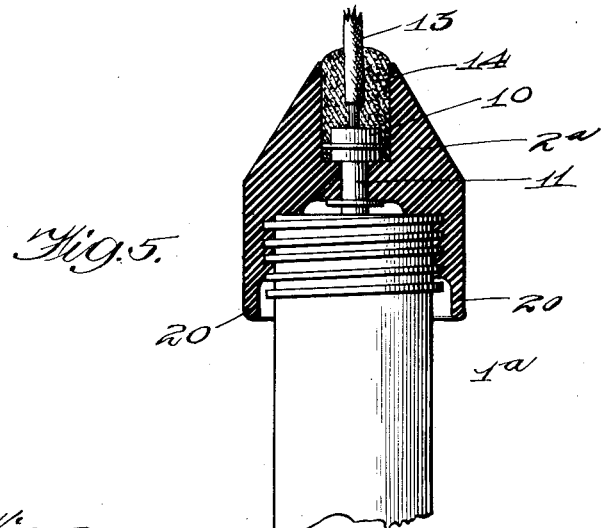
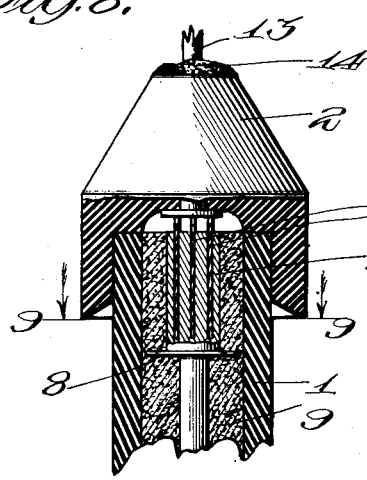
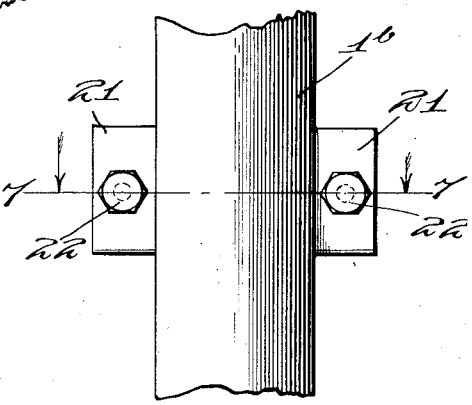
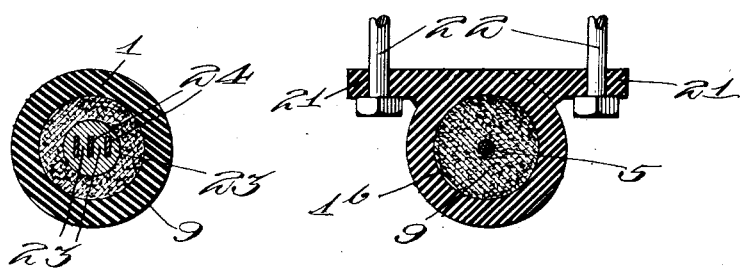
Witnesses:
M. Duplessis.
J. C. Lu
Inventor:
Paul F. Williams
by A. Miller Belfield
Atty.

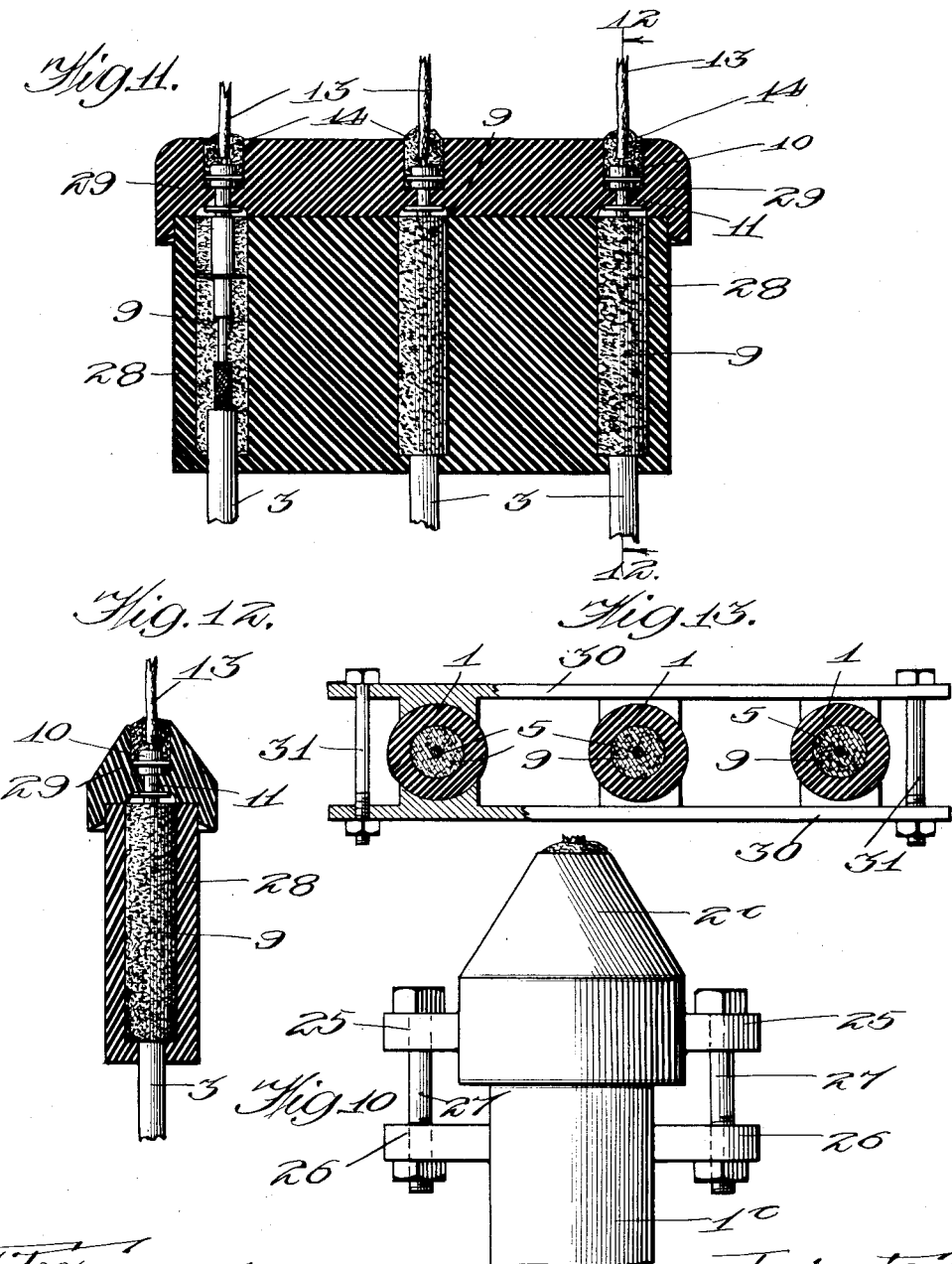

UNITED STATES PATENT OFFICE.

PAUL F. WILLIAMS, OF CHICAGO, ILLINOIS.

CONNECTOR FOR ELECTRICAL CONDUCTORS.

No. 831,815.   Specification of Letters Patent.   Patented Sept. 25, 1906.

Application filed May 23, 1905. Serial No. 261,785.

*To all whom it may concern:*

Be it known that I, PAUL F. WILLIAMS, a citizen of the United States, residing at Chicago, in the county of Cook and State of Illinois, have invented a certain new and useful Improvement in Connectors for Electrical Conductors, of which the following is a full, clear, concise, and exact description, reference being had to the accompanying drawings, forming a part of this specification.

My invention relates to devices by which connection can be made with the ends of electrical conductors—as, for instance, between two cables or between a cable and an overhead conductor.

The principal object of the invention is to provide a simple, practical, and effective connector or joint of the kind described, and especially to dispense with the use of a solder wipe-joint therein.

Figure 1:
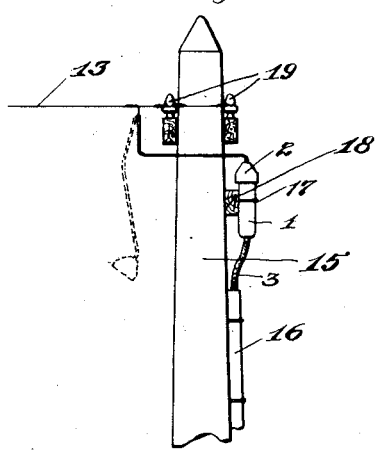
Figure 2:
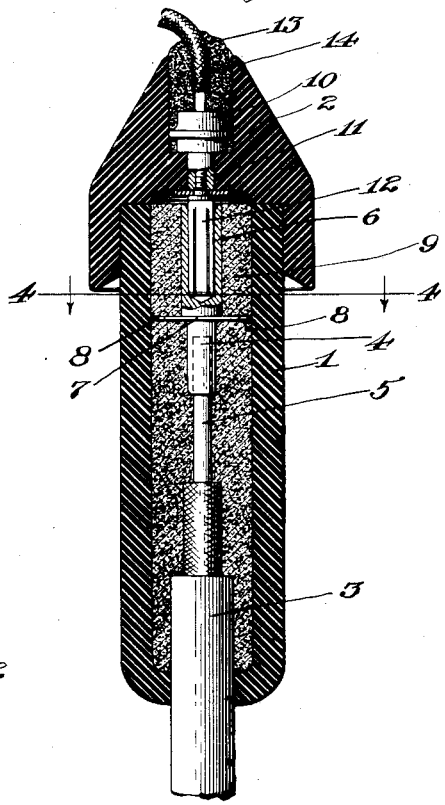
Figure 3:
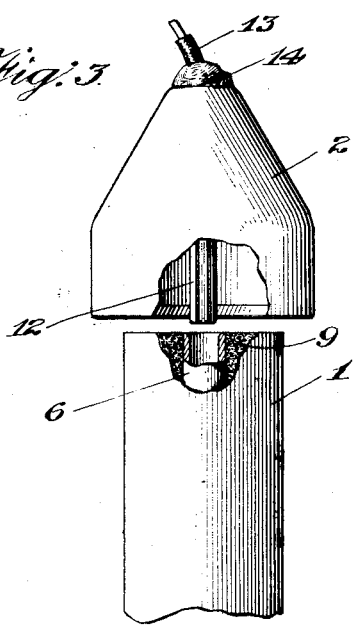
Figure 4:
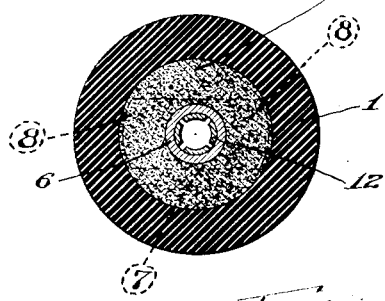

In the accompanying drawings, Figure 1 is a view of a pole and an overhead wire and cable connected together by a connector embodying my invention. Fig. 2 is a longitudinal section through such a connector. Fig. 3 is an elevation of a portion of the same. Fig. 4 is a section taken on line 4 4 in Fig. 2. Figs. 5 to 10, inclusive, are views of modified forms of construction. Figs. 11, 12, and 13 are views of two modified forms, each for connecting a plurality of cables.

Referring first to Figs. 2, 3, and 4, the device shown comprises a casing 1 and a cover or hood 2, fitted to the open top of the casing 1, both made of insulating material—such, for example, as porcelain. A cable 3 is extended up through an aperture in the bottom of the casing 1 and provided with a terminal 4, which is conveniently in the form of a metallic spindle provided with a socket adapted to receive the end of the conductor 5 of the cable, and also provided with a larger outwardly-facing socket 6. This terminal 4 is also provided with a laterally-projecting flange 7 to hold its center within the casing 1, the side portions 8 8 of this flange 7 being cut away. This terminal 4 is secured to the cable-conductor 5, preferably by soldering such conductor in the socket provided for it. The space between the cable and its terminal 4 and the interior walls of the casing 1 is filled with minerallac or other suitable insulating material 9. The hood 2 is provided with another terminal 10 conveniently in the form of a plug 11, having a split end 12, adapted to fit in the socket 6 of the terminal 4. The terminal 10 is secured to the end of a conductor 13, to which the cable 3 is to be connected. As a convenient arrangement the terminal 10 is provided with a socket adapted to receive the conductor 13, and the latter is soldered therein. The aperture in the top of the hood 2 to receive the terminal 10 is also filled with insulating material—such, for example, as minerallac.

In using the device the cable is first inserted through the lower end of the casing 1 and pushed up through the same, so that its conductor 5 projects from its open end, so as to be accessible, and then the terminal 4 is soldered to the conductor 5. The cable with its terminal is then pushed back into the casing and minerallac or other insulating material is poured into the cavity thereof until it fills or substantially fills the same, such material passing down below the flange 7 by reason of the cut-away portions 8 8 thereof. The terminal 10 is then secured to the conductor 13 and the split end 12 thereof secured to said terminal 10, whereupon the cover 2 is placed upon the top of the casing 1 and the split plug 12 pushed into the socket 6, thereby connecting the cable with the conductor or other cable. Thus it will be seen that the necessity of a wipe-joint in forming a terminal or connection for the cable is avoided, and at the same time the cable can be disconnected from its connection by merely removing the cover 2.

In using the device it may be used as shown in Fig. 1, in which is illustrated a pole or post 15, along the side of which extends a pipe 16, containing the cable 3, the upper end of the latter being provided with the terminal embodying my invention, which for convenience is fastened by a band 17, attached to a block 18 on the pole 15. The pole is shown provided with a pair of insulators 19 19, to which is connected the overhead conductor 13, which is extended to and through the same and connected with the cable 3. In disconnecting the cable the cover 2, if removed, will hang, as shown in dotted lines in Fig. 1. In Fig. 3 is shown the device with the cover partly removed, showing how its separable terminals become disconnected from one another.

In Fig. 5 I have shown the device modified in two respects. One of these is that the hood 2ª is provided with an overhang 20, by which rain-water is led down and caused to drip, thereby preventing it from gaining access to the interior of the device. The other modification is that the hood 2ª and the casing 1ª are threaded, so that the hood is screwed upon the latter, and thereby held in position.

The device of Figs. 6 and 7 is shown so constructed as to make its attachment to a post or other article easy and convenient. This arrangement consists in providing the casing 1ᵇ with side lugs or ears 21 21, through which bolts 22 22 can be extended to attach the device as desired.

The device of Figs. 8 and 9 is provided with a different form of separable terminal. This form of terminal consists of interengaging knife-blades 23 23 on the lower terminal and blades 24 24 on the upper terminal.

In Fig. 10 I have shown a device provided with another construction for retaining the hood in place. In this device the hood 2ᶜ and casing 1ᶜ are provided with laterally-projecting ears 25 25 and 26 26, respectively, through which are passed securing or retaining bolts 27 27.

In Figs. 11 and 12 is shown a device for the connection of a plurality of cables. This device comprises an insulating-base 28, made of porcelain or similar material, and a top or cover 29 of the same material, adapted to fit on the base 28. The base 28 and top 29 are provided with three sets of separable terminals, the construction of which can be and is shown the same as the device of Figs. 2, 3, and 4. By this arrangement three cables of a three-wire system, for example, can be connected and disconnected in any convenient and expeditious way.

In Fig. 13 is shown a frame conveniently consisting of members 30 30, clamped together by bolts 31 31, embracing a plurality of terminal devices such as shown in Figs. 2, 3, and 4. By this arrangement also a plurality of cables of a two or three wire system can be accommodated.

It will be understood that changes and modifications can be made without departing from the spirit of the invention, and especially that while I have shown a cable-connector herein the invention can be used for connecting other forms of electrical conductors.

What I claim is—

1. A device of the class specified, comprising a pair of separable members composed of insulating material, said members receiving and confining the ends of the conductors to be connected, means for connecting said conductors, and insulating material hermetically sealing the confined ends of the conductors and the connecting means therefor within said separable members.

2. A device of the class specified, comprising a pair of separable members both made of insulating material and provided with means for engaging and forming a tight joint with one another, means whereby the ends of the conductors within said members can be connected with one another, and insulating-cement filling said members and hermetically sealing the conductors and connecting means therein.

3. A device of the class specified, comprising an insulating-sleeve adapted to receive the cable end, said sleeve being made of insulating material, a top also made of insulating material and adapted to fit over the end of said sleeve, connecting devices applied to the ends of the cable and of the conductor, and insulating-cement substantially filling said sleeve and hermetically sealing the ends of the cable and the connecting device therefor.

4. A device of the class specified, comprising an insulating-sleeve adapted to receive the cable end, said sleeve being made of insulating material, a top also made of insulating material and adapted to fit over the end of said sleeve, connecting devices applied to the ends of the cable and of the conductor, insulating-cement substantially filling said sleeve and hermetically sealing the ends of the cable and the connecting device therefor, the top being provided with a chamber containing a connecting device for a conductor, which chamber opens outwardly and receives the conductor, and insulating-cement filling said chamber and hermetically sealing the end of the conductor and the connecting device therefor.

5. A device of the class specified, comprising an insulating-sleeve for the end of the cable, a connecting device to be applied to the end of the cable, comprising a pair of oppositely-open sockets and a disk portion 8, insulating-cement filling said sleeve and hermetically sealing the end of the cable and said connecting device therein, a top having a socket adapted to fit over the end of the insulating-sleeve, a connecting device consisting of a plug adapted to fit in the socket of said other connecting device, a chamber in the end of the top, said chamber containing the end of the connecting device of the top, and insulating-cement filling said chamber and hermetically sealing the end of the conductor and connecting device therein.

In witness whereof I hereunto subscribe my name this 16th day of May, A. D. 1905.

PAUL F. WILLIAMS.

Witnesses:
A. M. BELFIELD,
I. C. LEE.